Patented Aug. 3, 1954

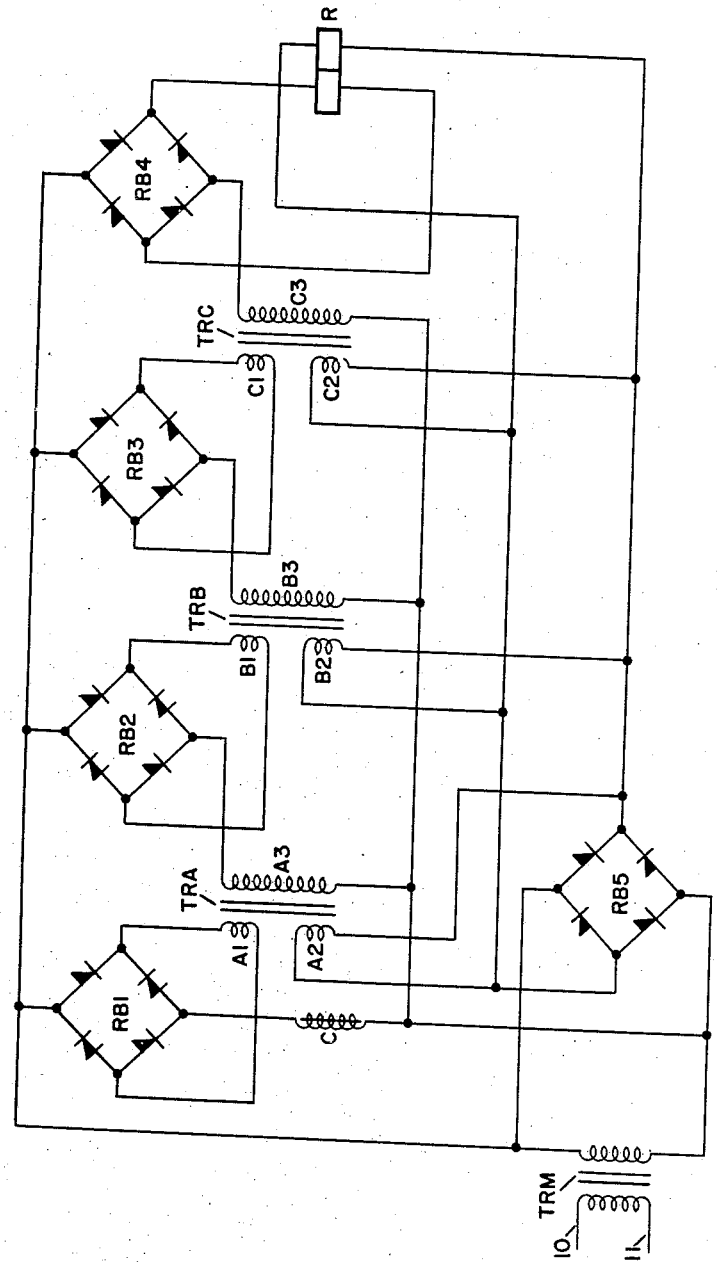

2,685,680

UNITED STATES PATENT OFFICE 2,685,680

MAGNETIC VEHICLE DETECTOR

Merrel Omer Williams, Liverpool, England, assignor to Automatic Telephone & Electric Company Limited, Liverpool, England, a British company Application November 18, 1948, Serial No. 60,724

Claims priority, application Great Britain November 19, 1947

3 Claims. (Cl. 340—38)

The present invention relates to vehicle detectors and is particularly suitable for detecting the passage of road vehicles. Its chief object is to provide a construction enabling such detection to be reliably effected by apparatus not involving any moving parts in the roadway so that the detecting device can be put in position, for instance buried beneath the road surface, and is not likely to require attention subsequently for many years. For this purpose use is made of the fact that the vast majority of road vehicles include magnetic materials which in most cases will have acquired a certain amount of permanent magnetism during their construction or use and in any event will serve to disturb the normal distribution of a magnetic field embracing the detector.

According to one feature of the invention, in an arrangement suitable for detecting the passage of road vehicles a coil provided with a core of magnetic material and located adjacent to the path of the vehicles requiring detection is normally magnetized just short of saturation and is connected to an amplifier so that the change in flux through the coil due to the passage of a vehicle produces a change in its impedance whereby an impulse suitable for effecting the operation of a relay or the like is obtained from the output of the amplifier.

According to another feature of the invention, in an arrangement suitable for detecting the passage of road vehicles a coil provided with a core of magnetic material and located adjacent to the path of the vehicles requiring detection is normally magnetized just short of saturation by the earth's magnetic field and is connected in the first stage of a multistage magnetic amplifier so that the change in impedance of the coil due to the passage of a vehicle generates an impulse suitable for operating a relay or the like.

The invention will be better understood from the following description of one method of carrying it into effect in which it is intended to be used for the detection of road vehicles in order that suitable control may be exercized in a vehicle-actuated traffic control system. The accompanying drawing shows in the usual digrammatic manner the circuits of the detecting equipment.

The general principle is that the core of the coil C is normally magnetized just short of saturation and the disturbance of the magnetic field produced by the passage of a vehicle increases the flux through the coil so that by virtue of the existing condition of saturation the impedance of the coil is reduced. The momentary change thereby produced is passed through a magnetic amplifier from the output of which an impulse is obtained of sufficient strength to cause the operation of a relay.

Considering the circuit in detail, leads 10 and 11 are assumed to be connected to alternating current electric supply mains and thus energize the primary of the transformer TRM. The secondary of this transformer feeds the coil C and the rectifier bridge RB1 in series so that normally alternating current flows through the coil C while direct current flows through the winding A1 of the saturable core reactor TRA. The transformer TRM also feeds the rectifier bridge RB5 which then supplies direct current to the compensating windings A2, B2 and C2 of the saturable core reactors TRA, TRB and TRC which substantially neutralize the normal effect of their associated windings A1, B1 and C1. The winding A3 of the core reactor TRA is connected to the secondary of transformer TRM in series with the rectifier bridge RB2, the direct current output of which feeds the winding B1 of the reactor TRB. The winding B3 of this reactor is similarly fed from transformer TRM in series with the rectifier bridge RB3 and the direct current output from RB3 feeds the winding C1 of reactor TRC. The winding C3 of this reactor is similarly connected in series with the rectifier bridge RB4 and the direct current output of this bridge supplies the left-hand winding of the relay R. The right-hand winding of this relay is fed with constant direct current from the rectifier bridge RB5 and conditions are adjusted so that the effect of these two windings is normally equal and opposite so that the relay does not operate.

The coil C is preferably mounted with its core in a vertical position as near to the road surface as is convenient and the normal state of virtual saturation is produced by the vertical component of the earth's magnetic field. This can be achieved by the use of a comparatively long thin core of some material such as mumetal. For the purpose of illustration but without specific limitation thereto, the coil C with its core may have a form similar to that of the impulse coil and core illustrated and described on page 442 of the reference Volume 93, Part 1, No. 70 of the "Journal of the Institution of Electrical Engineers," October 1946, a British publication, for example, but without regard to the circuit connected to the coil in the reference, it being appreciated that the impulse coil winding may be expanded in size as needed or desired without the surrounding neutralizing solenoid employed in the reference as part of a magnetometer. The use of the vertical mounting, that is to say at right angles to the normal plane of progression of the vehicles, is not essential but is preferred as tending to give more consistent results. Horizontal mounting could also be employed and mounting at an angle might be desirable in certain circumstances to facilitate the obtaining of unidirectional operation though clearly a position at right angles to the dip needle would be unsuitable. The use of the earth's magnetic field to produce the saturation effect is found to give satisfactory results and simplifies the general design.

When a vehicle passes in the vicinity of the coil C, the disturbance of the existing magnetic field causes an increase in flux through the core of the coil C sufficient to take it over the knee of the saturation curve. Accordingly its impedance is decreased and there is an increase of current through the winding A1. This produces a similar over saturation effect of the reactor TRA and reduces the impedance of winding A3 so that there is a corresponding but greater increase in current through this winding. This process is repeated through the various stages of the amplifier in known manner and an increase is produced in the current through the left-hand winding of the relay R sufficient to cause the relay to operate. Thereupon it closes contacts (not shown) to complete a circuit whereby the presence of the vehicle causes suitable modification of the operation of the traffic control signals.

It will be understood that the amplifier portion of the equipment may be located at a reasonable distance from the detecting coil, for instance in the usual control pillar, and that the requirement that supply mains shall be available is not serious in practice since electric power is normally required for the lighting of the signal lamps. Moreover, the amount of power normally consumed is very small and the use of an amplifier of the magnetic type avoids a continuous drain for the heating of the cathodes of thermionic valves which are themselves liable to be a source of trouble. Furthermore the use of the principle that over-saturation causes a change of impedance, when applied to the detecting coil itself in combination with a magnetic amplifier using the same principle, gives a very neat and compact circuit arrangement which has obvious advantages including the known ones which spring from the use of a detector with no moving parts and buried beneath the road surface.

It is of course appreciated that as with all magnetic detectors, operation by pedestrians, horses and vehicles which do not embody an appreciable amount of magnetic material in their construction will be problematical. In all normal circumstances however this is not found to be objectionable and considerable advantages are obtained from the use of a detector which can be arranged to have very many years of life without deterioration and is not liable to faults which involve breaking up the road surface or even the need for workmen to operate in the normal path of traffic.

I claim:

1. An arrangement suitable for detecting the passage of road vehicles including in combination a coil provided with a core of magnetic material and located adjacent to the path of the vehicles requiring detection, said core being normally magnetized just short of saturation by the earth's magnetic field, an amplifier of the multi-stage magnetic type, and a rectifier bridge having alternating current input and direct current output terminals, the alternating current terminals connected in series with said coil and with an alternating current energizing source, and the direct current terminals connected to the input of said amplifier so that the change in flux through the coil due to the passage of a vehicle produces a reduction in its impedance to increase the alternating current in said alternating current input to provide an impulse to said amplifier whereby a corresponding amplified impulse suitable for effecting the operation of a relay or the like is obtained from the output of the amplifier.

2. An electrical apparatus for detecting the passage of road vehicles including in combination, a coil provided with a core of magnetic material and located adjacent to the path of the vehicles requiring detection, means for normally magnetizing said core just short of saturation in the absence of passage of a vehicle whereby upon passage of a vehicle having a magnetizing effect on said core a considerable reduction in impedance will occur in said coil, a magnetic amplifier a rectifier bridge having alternating current input and direct current output terminals, the alternating current terminals connected in series with said coil and with an alternating current energizing source, and the direct current terminals connected to the input of said amplifier whereby such reduction in impedance of said coil upon passage of such vehicle will produce a corresponding change in impedance in the input of said amplifier and a corresponding greater change in impedance in the output of said amplifier, and means connected to the output of said amplifier to be operated by the change of impedance in said output to indicate passage of such vehicle.

3. An electrical apparatus for detecting the passage of road vehicles including in combination, a coil provided with a core of magnetic material and located adjacent to the path of the vehicles requiring detection, means for normally magnetizing said core just short of saturation in the absence of passage of a vehicle whereby upon passage of a vehicle having a magnetizing effect on said core a considerable change in impedance will occur in said coil, a saturable core reactor having two control windings and an output winding, a rectifier bridge, an A. C. circuit including one leg of said rectifier bridge and said coil in series, a circuit connecting in series the D. C. leg of said rectifier bridge and one of said control windings of said reactor, a D. C. supply connected to the other control winding of said reactor to neutralize substantially any magnetizing effect on said reactor arising from the normal current flowing in said circuit in absence of passage of a vehicle, whereby any substantial change in impedance of said coil resulting from passage of a vehicle will be reflected in a change in current in said first winding of said reactor to provide a substantial change in impedance in the output winding of said reactor, and means including an output device connected to the output of said reactor.

(References on following page)

References Cited in the file of this patent

UNITED STATES PATENTS

| Number | Name | Date |
|---|---|---|
| 1,959,690 | Roth | May 22, 1934 |
| 2,027,311 | Fitzgerald | Jan. 7, 1936 |
| 2,034,881 | Scheer | Mar. 24, 1936 |
| 2,051,369 | Durbin | Aug. 18, 1936 |
| 2,132,277 | Stewart | Oct. 4, 1938 |
| 2,321,618 | Potts | June 15, 1943 |
| 2,387,544 | Usselman | Oct. 23, 1945 |
| 2,406,870 | Vacquier | Sept. 3, 1946 |
| 2,409,610 | Bixby | Oct. 22, 1946 |
| 2,434,273 | Ketchledge | Jan. 13, 1948 |
| 2,437,661 | Coake | Mar. 9, 1948 |
| 2,441,568 | Finison | May 18, 1948 |
| 2,450,166 | Rich | Sept. 28, 1948 |
| 2,456,463 | Starie | Dec. 14, 1948 |
| 2,492,182 | Robinson | Dec. 27, 1949 |
| 2,505,511 | Vogel | Apr. 25, 1950 |
| 2,531,313 | Wannamaker | Nov. 21, 1950 |

OTHER REFERENCES

Journal of the Institution of Electrical Engineers, October 1946, volume 93, part 1, No. 70, pages 435, 442, 443.